(12) United States Patent
Jole

(10) Patent No.: US 8,673,172 B2
(45) Date of Patent: Mar. 18, 2014

(54) LATEX ACCELERATOR COMPOSITION

(75) Inventor: Evert Van Jole, Ottignies-Louvain-la-Neuve Belgium (BE)

(73) Assignee: Kraton Polymers U.S. LLC, Houston, TX (US)

( * ) Notice: Subject to any disclaimer, the term of this patent is extended or adjusted under 35 U.S.C. 154(b) by 963 days.

(21) Appl. No.: 11/997,846

(22) PCT Filed: Jul. 24, 2006

(86) PCT No.: PCT/EP2006/064591
§ 371 (c)(1),
(2), (4) Date: May 20, 2008

(87) PCT Pub. No.: WO2007/017368
PCT Pub. Date: Feb. 15, 2007

(65) Prior Publication Data
US 2008/0303189 A1  Dec. 11, 2008

(30) Foreign Application Priority Data

Aug. 5, 2005 (EP) .................................... 05107251

(51) Int. Cl.
*C09K 3/00* (2006.01)
*B27N 3/08* (2006.01)
*B28B 1/38* (2006.01)
*B28B 1/14* (2006.01)
*B29C 39/00* (2006.01)
*B29C 41/00* (2006.01)

(52) U.S. Cl.
USPC ............ 252/182.13; 252/182.11; 252/182.12; 264/239; 264/299; 264/301

(58) Field of Classification Search
USPC ........ 264/301, 299, 239; 252/182.13, 182.12, 252/182.11
See application file for complete search history.

(56) References Cited

U.S. PATENT DOCUMENTS 7,700,705 B2 * 4/2010 Jole ................................ 526/335
2004/0169317 A1 * 9/2004 Wang et al. .................... 264/301

FOREIGN PATENT DOCUMENTS

| WO | 02/049430 A1 | 11/2002 | |
|---|---|---|---|
| WO | 03/072340 A1 | 9/2003 | |
| WO | WO 03072340 A1 * | 9/2003 | ............. B29D 22/00 |

OTHER PUBLICATIONS

Chakraborty et al. "Safer Accelerators for the Latex Industry" RAPRA Latex 2004 Conference Hamburg Germany Apr. 20-21, 2004.*
Chakaraborty, K.B., et al., "Safer accelerators for the latex industrie", Latex 2004, Apr. 21, 2004, XP00805572, Hamburg.

* cited by examiner

*Primary Examiner* — Patrick Ryan
*Assistant Examiner* — Aaron Greso
(74) *Attorney, Agent, or Firm* — Novak Druce Connolly Bove + Quigg LLP; Michael A. Masse

(57) ABSTRACT

Accelerator composition for a rubber latex derived from a conjugated diene and optionally a vinyl aromatic comonomer including: (i) a diisopropyl xanthogen polysulphide (DIXP), (ii) an alkyldithiocarbamate wherein the alkyl chain contains from 5 to 20 carbon atoms, and (iii) diphenylguanidine (DPG), a curable aqueous synthetic rubber latex composition including said accelerator composition, a process for the water-based solvent-free manufacture of synthetic shaped synthetic elastomeric articles, prepared by using the accelerator composition.

17 Claims, No Drawings

LATEX ACCELERATOR COMPOSITION

CROSS REFERENCE TO RELATED APPLICATIONS

This application claims priority to EP2005000107251, filed on Aug. 5, 2005.

TECHNICAL FIELD

The invention relates to the field of shaped elastomeric articles derived from a curable elastomer latex composition.

More in particular the present invention relates to improvements to the process of making elastomeric articles and a latex accelerator composition to be used therein.

The shaped elastomeric articles are more in particular made from a curable poly(isoprene) latex composition and are in particular used for medical, health care and personal hygiene applications.

BACKGROUND ART

The manufacturing process for producing elastomeric articles from natural or synthetic rubber latex involves a curing step during which cross linking or vulcanisation occurs through sulphur groups between the polymer units.

Conventional processes for making elastomeric articles from natural or synthetic latex typically involve preparing a latex precompound, dispersion or emulsion, obtained by mixing latex, sulphur, an activator and an accelerator system, maturation for a certain period, dipping a former in the shape of the article to be manufactured into a coagulant and subsequently into the latex precompound and curing the latex present on the former.

Desirable properties of certain elastomeric articles such as tensile strength are substantially affected by the cross linking and curing stages of the manufacturing process.

The use of sulphur or sulphur containing compounds as vulcanising agent and zinc oxide as activator, the use of mixtures of inorganic salts (calcium nitrate, calcium carbonate and surface active agents) as a coagulator, and the use of vulcanising or sulphur cross linking accelerator compositions in the manufacture of rubber articles, is well known.

Conventional vulcanisation accelerators include dithiocarbamates, thiazoles, guanidines, thioureas and sulphenamides.

Certain fields, in which elastomeric articles are needed, such as the medical, health care or personal hygiene field, utilized specific types of equipment and processing techniques which enables the specific performance and regulatory requirements of the particular article produced.

The use of natural rubber latex in the manufacture of certain article such as medical gloves has been associated with disadvantageous properties such as allergic reactions, generally believed to be caused by natural proteins or allergens present within the natural rubber latex and the final product.

Synthetic elastomeric products and manufacturing processes which altogether reduce or avoid the likelihood of potential adverse reactions of the user or wearer, are of increasing interest in the medical field, particularly in the field of gloves.

A majority of glove manufacturing processes are water-based dipping systems.

It is generally known that solvent-based systems can possibly be used for poly(isoprene) and other elastomers although such solvent-based systems are poorly suited for the manufacture and molding of elastomeric articles for medical applications. One difficulty in the field of gloves for example is the design of processes and materials which will produce a thin elastomeric article having desirable properties such as high tensile strength. Another disadvantage of solvent-based systems is solvent toxicity.

Process and materials that would obviate or reduce the need for the use of toxic solvents, while at the same time yielding a product having desirable properties for medical applications, are thus still being explored.

More recently a process was proposed (WO 02/090430) for the manufacture of elastomeric poly(isoprene) articles such as medical gloves, condoms, probe covers, catheters, comprising the steps of:
1. preparing an aqueous latex composition containing an accelerator composition and a stabilizer, said accelerator composition comprising a dithiocarbamate, a thiazole and a guanidine compound;
2. dipping a former into said compounded latex composition; and
3. curing said compound latex composition on said former to form said elastomeric poly(isoprene) article.

Preferably said accelerator composition comprised zinc diethyldithiocarbamate, (ZDEC), zinc-2-mercaptobenzothiazole (ZMBT) and diphenylguanidine (DPG).

Although the use of said accelerator composition represented an improvement of the manufacturing process, it has been found that all these accelerators are capable of producing Type IV allergic response in human beings and may also possess increasingly unacceptable eco-tox and acute toxicity profiles. In addition ZDEC and ZMBT have been found to produce potentially harmful N-nitrosamines.

Another characteristic of said accelerator composition was that actually a stabilizer had to be used in conjunction with said accelerator system to prolong the stabilisation of the precured poly(isoprene) latex as is known from e.g. "Safer Accelerators for the Latex Industry", Sakroborty K. B. and Couchman R., Latex 2004, Hamburg, 20-21 Apr. 2004, p. 75-87. Although in said publication compounding experiments with an accelerator system, comprising diisopropyl xanthogen polysulphide (DIXP) and a long alkyldithiocarbamate (ZDNC) instead of ZDEC and ZMBT but without any diphenyl-guanidine, were disclosed, the requirements for mechanical properties and cycle time (long maturation times) were not met. Although in this publication reference was made to occurrence of the required mechanical properties via film casting after maturation for 8 days at 30° C., this technique has been recognised as not suitable for the production of gloves or condoms.

Moreover, it was found in comparative compounding experiments in which DPG was omitted, that long maturation times of more then 4 weeks were necessary to obtain reasonable mechanical properties, which is unacceptable for the manufacture of gloves etc.

Recently, further work was published in "Novel Sustainable Accelerators for Latex Applications—Update", Sakroborty K. B. and Couchman R., 8$^{th}$ International Latex Conference 2005, Charlotte, N. C., USA, 26-27 Jul. 2005. The authors describe a composition comprising DIXP and ZDNC without DPG to obtain desirable mechanical properties. However the method used does not involve coagulant dipping, but rather film casting, which makes the results not representative or even relevant for glove production. Moreover, the higher maturation temperatures used can be considered as not optimal for an economic industrial application.

It will be appreciated that there is still a strong need for an improved manufacturing process for gloves etc. from synthetic rubber latex, providing films from a stable precompound of latex, showing the required mechanical properties (tensile strength≥24 MPa; elongation at break≥750%) within a cycle time of 1 day, by using less amounts of vulcanising agent and activator and in particular sulphur, a safe accelerator system and a maturation time from some hours to less than 2 days.

As result of extensive research and experimentation said improved manufacturing process and acceleration system to be used therein, have surprisingly been found.

DISCLOSURE OF INVENTION

Accordingly, the present invention relates to an accelerator composition for a latex rubber, derived from a conjugated diene and optionally a vinyl aromatic comonomer, comprising:
(i) a diisopropyl xanthogen polysulphide (DIXP),
(ii) an alkyldithiocarbamate, wherein the alkyl chain contains from 5 to 20 carbon atoms, like e.g. zinc diisononyl dithiocarbamate (ZDNC), and
(iii) diphenylguanidine (DPG).

Another aspect of the present invention is formed by a curable aqueous synthetic rubber latex composition, comprising a synthetic rubber latex, a vulcanising agent, an activator and an accelerator system as specified hereinbefore.

Preferred ingredients (ii) contain alkyl chains from 8 to 15 carbon atoms. Diisononyl dithiocarbamate (ZDNC) is the most preferred. Suitable DIXP and ZDNC accelerators are commercially available at Robinson Brothers Ltd., West Bromwich, UK.

It will be appreciated that still other aspects of the present invention are formed by a process for the water-based manufacture of synthetic elastomeric articles from a curable synthetic rubber latex composition as defined hereinbefore, and by shaped synthetic elastomeric articles prepared from the hereinbefore specified curable aqueous synthetic rubber latex compositions.

Applicants have actually provided an improved three-component accelerator composition for sulphur cross linkable latex of a synthetic rubber, which can be used with latex in a process for making elastomeric articles, having the desirable properties (e.g. tensile strength) and more in particular articles for medical applications such as surgical and examination gloves, medical devices (catheters) and food contact and child related products (nipples and pacifiers). Said process has been found to enable an economic water-based process, without the need for new costly additional materials or equipment, and with lesser amounts of vulcanising agents and stabilizers, and providing economically attractive maturation times.

DETAILED DESCRIPTION OF THE INVENTION

The curable aqueous synthetic rubber latex compositions according to the present invention comprise a synthetic rubber latex, a vulcanising agent, an activator and an accelerator system. In particular said aqueous rubber latex may be derived from poly(isoprene), poly(butadiene), poly(chloroprene), poly(neoprene), styrene-isoprene copolymers having a substantially random structure or containing detectable blocks of one or more comonomers. The backbone of the polymer or copolymer may be straight or branched but is preferably straight. Most preferred is a poly(isoprene) latex as poly(isoprene) is one of the preferred polymers due to its chemical similarity to natural rubber, as well as its physical properties such as feel, softness modulus, elongation at break and tensile strength.

Poly(isoprene) latex, poly(butadiene) latex, poly(styrene/isoprene) latex, poly(styrene/butadiene) latex, to be used as mayor component of the pre-cure latex composition, are readily available and can be obtained from KRATON Polymers Inc., USA and KRATON Polymers B.V., the Netherlands; Apex Medical Technologies Inc., USA and Aqualast E 0501 is available from Lord Corporation, USA.

In addition to poly(isoprene), poly(isoprene) copolymers and poly(isoprene) blends can be used as well. Suitable poly(isoprene) blends can include e.g. poly(conjugated diene) and copolymers comprising styrene and thermoplastic material such as polyurethane and the like. A preferred poly(isoprene) latex is KRATON IR-401 latex.

It will be appreciated that the accelerator compositions as specified hereinbefore and to be used according to the present invention, can also be applied on natural rubber lattices from which the undesired accompanying proteins have been substantially eliminated (modified natural rubber latices).

According to a preferred embodiment of said latex composition, the components (i), (ii) and (iii) occur in a concentration of from 0.25 to 1.00 phr, relative to the weight of synthetic rubber solid. More preferably concentrations of these components are in the range of from 0.25 to 0.80 phr.

The hereinbefore specified concentrations of DPG have been found to be critical as in comparative experimentation with accelerator compositions without any DPG, long maturation times or high maturation temperatures of the precure latex compositions in order to obtain desirable mechanical properties, were found to be unacceptable for industrial processing.

Another advantage of the present invention is that conventional manufacturing equipment and most readily available materials can be used in accordance with the invention to make the synthetic rubber and preferably poly(isoprene) glove without the need for new or costly additional materials or equipment. No complicated new process steps are required by the invention, due to the improved maturation time and storage stability.

Another advantage of the present invention is that ready to use poly(isoprene) latex compositions, formulated in accordance with the invention, exhibits prolonged storage stability, i.e. without undesired coagulation. The use of an additional stabilizer is not necessary. For example, the pre-cure storage stability of the compounded poly(isoprene) latex composition (i.e. the time period prior to the use of the complete poly(isoprene) latex composition in the dipping and curing steps) can extend to 10 days. With such an extended storage life of the latex, the amount of waste latex can be significantly reduced and greater flexibility in scheduling manufacturing processes is permitted.

Another aspect of the present invention is formed by a process for the water-based manufacture of synthetic elastomer articles, comprising the preparation of a latex dispersion or emulsion, comprising a vulcanising agent, an activator and an accelerator system, maturation of the latex dispersion for a period of from 0.5 to 1.5 days, dipping a former in the shape of the article into the latex and curing the latex, present on the former.

An advantage of the process of the present invention and the curable aqueous synthetic rubber latex composition to be used therein, is the economically attractive maturation time period and temperature, as well as the dipping temperature. Accordingly, significant cost and resource advantages are provided over conventional manufacturing processes. More in particular, a maturation time period, varying from 12 to 36 hours and preferably from 18 to 24 hours, can be used and processing temperatures of less then 35° C. and in particular from 15 to 35° C. can be used.

The invention also provides for synthetic elastomeric articles made by the hereinbefore specified process.

Elastomeric articles made by said process can exhibit tensile strengths of over 20 MPa and preferably of over 24 MPa (for surgical gloves), as measured according to ASTM D-412, and elongation at break values of at least 700% and for surgical gloves of ≥750%.

If desired a stabilizer, which is not necessary in principle, can be used in certain special circumstances. Any stabilizer known in the art as useful in curable latex systems can be used, provided it is compatible with the other ingredients and provides the desired function, i.e. prolongs stabilization of the pre-cure compounded poly(isoprene) latex. A variety of stabilizers can be used including but not limited to, milk protein salts, anionic surfactants such as sodium lauryl sulphate and sorbitan fatty acid esters. Milk protein salts are preferred as possible stabilizer. In particular alkaline earth metal caseinate salts are preferred, such as sodium caseinate, potassium caseinate, manganese caseinate and zinc caseinate, and combinations thereof. Other possible stabilizers can be selected from sodium lauryl(3)sulphate, branched sodium dodecylbenzene and sorbitan fatty acid ester surfactans, such as polyoxyethylene sorbitan fatty acid esters.

The curable aqueous synthetic elastomer composition according to the present invention may in addition to synthetic elastomer latex, accelerator composition, curing agents such as sulphur, organic sulphides or other sulphur donor compounds, comprise activators such as alkaline earth metal oxides, such as zinc oxide, and antioxidants such as Wingstay or Aquanox (trade names) (e.g. butylated reaction product of p-cresol and dicyclopentadiene (DCPD)).

The invention is useful in manufacturing processes for elastomeric articles composed of poly(isoprene). The invention affords the ability to produce synthetic poly(isoprene) articles which closely mimic the physical properties of elastomeric articles made from natural rubber latex. The invention can be advantageously incorporated into the manufacturing of surgical gloves, condoms, probe covers, dental dams, finger cots, catheters, and the like.

The invention has been described with reference to various specific and preferred embodiments and techniques. However, it should be understood that many variations and modifications can be made while remaining within the spirit or scope of the invention as defined by the claims set forth below.

Preparation of a Preferred Poly(Isoprene) Latex Precompound Composition

The preferred poly(isoprene) latex composition in accordance with the present invention can be prepared using the following general procedure:

Poly(isoprene) latex (typically 60 wt % solids) is stirred at 25° C. The pH can be adjusted by addition of 0.2 phr KOH to a range of from 8.5 to 9.0. Sulphur is added, followed by zinc oxide and accelerator compounds. The accelerator components DIXP, ZDNC and DPG are added in ratios ranging from 0.25:0.25:0.25 phr to 0.80:0.80:0.80 phr dry weight per 100 parts poly(isoprene). Aquanox (anti-oxidant) is finally added and the mixture is stirred for approximately 10 minutes. The obtained latex composition is preferably stored at ambient temperature ranging from about 15° C. to about 25° C. At these temperatures the poly(isoprene) latex composition can be stored for periods lasting up to about 10 days prior to its use in the dipping and curing process.

Preparation of a Polyisoprene Glove

Initially, the pH of the poly(isoprene) latex composition can be adjusted to a pH of approximately 10. A glove former is pre-heated in an oven to a temperature of about 70° C. and then dipped in a pre-prepared coagulant composition at a temperature of about 55° C. for a period of time and then removed there from. Next, the coagulant-coated former is placed in a drying oven at 50° to 70° C. for a time sufficient to dry the coagulant, typically about 5 minutes.

The coagulant-coated former is removed from the oven and dipped into the poly(isoprene) latex precompound at ambient temperature, or at a temperature ranging from about 15° C. to about 30° C. The coated former is removed and placed in a oven at a temperature of about 50° C. to 70° C. for about 1 minute. The glove and former are removed from the oven and placed into a water leaching tank having a temperature of about 40° C. to 70° C., for about 5 to 20 minutes. The glove and former are removed from the leaching tank and placed drying at about 50° C. to 70° C. for a period sufficient to dry the glove, typically about 5 minutes. This is the end of the first curing stage.

At the second curing stage, the glove and former are placed in an oven heated to a temperature of about 100° C. to 120° C. for about 20 to 30 minutes. The glove and former are removed and cooled to ambient temperature. Finally, the glove is stripped from the former.

The gloves can be further treated in accordance with the particular needs, such as using lubrication, coating, halogenation, and sterilization techniques, all of which are conventional. Other conventional steps can be incorporated into the general process as well.

When prepared in accordance with the invention, elastomeric articles such as gloves exhibit the following physical properties: tensile strength of greater than about 24 MPa, elongation of greater than about 750% at break, and a tensile modulus of less than about 2 MPa at 300% elongation, as measured in accordance with ASTM D-412.

Other elastomeric poly(isoprene) articles can be prepared using processes similar to those described herein, in combination with conventional equipment and techniques readily available in the art. For example, an elastomeric article in the form of a condom can be prepared using a condom former.

The following example further illustrates the advantages of the invention and should not be construed as limiting the invention to the embodiments depicted therein.

EXAMPLES

Preparation of a Dipped Sample from a Poly(Isoprene) Latex

Poly(isoprene) latex (Kraton IR 401™, having a TSC of about 65%) was stirred at ambient temperature. While under continuous stirring, zinc oxide and sulphur dispersions were added to the mixture. Accelerator compounds DIXP, ZDNC and DPG were formulated into dispersions and then added. Aquanox L™ was added and the mixture was stirred for approximately 10 minutes. The composition (I) was maintained at a temperature of 25° C. and stored for 24 hours at a temperature of less than 25° C.

According to the same procedure poly(isoprene) latex compositions II-III and comparative example IV were prepared.

In the following table the formulation ingredients and their respective amounts have been specified. All percentages are percentages by weight unless noted otherwise.

TABLE 1

| Examples | I | II | III | Comparative example IV |
|---|---|---|---|---|
| KRATON IR-401 latex | 100 | 100 | 100 | 100 |
| KOH | 0.2 | 0.2 | 0.2 | 0.2 |
| Sulphur | 1.2 | 1.2 | 1.2 | 1.2 |
| Zinc oxide | 0.5 | 0.5 | 0.5 | 0.5 |
| DIXP | 0.4 | 0.4 | 0.4 | 0.4 |
| ZDNC | 0.4 | 0.4 | 0.4 | 0.4 |
| DPG | 0.25 | 0.25 | 0.5 | |
| Aquanox L | 2 | 2 | 2 | 2 |
| Maturation time (days) | 1 | 9 | 1 | 1 to 10 |
| MECHANICAL PROPERTIES | | | | |
| Tensile strength (MPa) | >30 | >30 | 24 | <3 |
| Modulus at 300% elongation (MPa) | 1.4 | 1.4 | 1.5 | 0.4 |
| Elongation at break (%) | 1300 | 1300 | 1400 | <400 |

A glass tube was dipped into a coagulant composed of calcium nitrate 30%, isopropanol 54.5%, distilled water 15% and wetting agent (Dresinate 214) 0.5% for a period of about 5 seconds and then removed. The coagulant coated former was dried at ambient temperature for a period of about 30 minutes.

The coagulant coated former was dipped into the compounded poly(isoprene) latex precompound of Formula (I) at a temperature of 20° C. for a period of 15 seconds. The coated former was removed and allowed to dry at room temperature for about 30 minutes.

Subsequently, the former was placed in a water leaching bath at 50° C. for a period of 30 minutes and removed. The former was placed in a pre-heated oven at 50° C. to 70° C. for a period of about 30 minutes to dry. Then the former was placed into a second stage curing oven at 100° C. for a period of about 20 minutes.

The former was removed from the oven, allowed to cool down to room temperature and gently removed from the former.

What is claimed is:

1. An accelerator composition comprising:
   (i) a curable aqueous synthetic rubber latex derived from the group consisting of a conjugated diene monomer; and a conjugated diene monomer with a vinyl aromatic comonomer; while further comprising:
   (ii) a diisopropyl xanthogen polysulphide (DIXP);
   (iii) an alkyldithiocarbamate, wherein the alkyl chain contains from 5 to 20 carbon atoms; and
   (iv) diphenylguanidine (DPG);
      wherein the composition is essentially free of zinc diethyldithiocarbamate (ZDEC) and zinc-2-mercaptobenzothiozole (ZMBT).

2. The accelerator composition of claim 1, wherein as component (ii) diisonyl dithiocarbamate (ZDNC) is used.

3. The curable aqueous synthetic rubber latex composition of claim 1 additionally comprising:
   (v) a vulcanizing agent; and
   (vi) an activator.

4. The curable aqueous synthetic rubber latex composition of claim 3, wherein the rubber latex is a poly(isoprene) rubber latex.

5. The curable aqueous synthetic rubber latex composition of claim 3, wherein each of the ingredients (i), (ii) and (iii) of the accelerator composition are present in a concentration of from 0.25 to 1.00 phr, relative to the weight of synthetic rubber solid.

6. The curable aqueous synthetic rubber latex composition of claim 5, wherein each of the ingredients (i), (ii) and (iii) of the accelerator composition are present in a concentration of from 0.25 to 0.80 phr, relative to the weight of the synthetic rubber solid.

7. A process for the water-based manufacture of synthetic elastomeric articles, comprising: (i) the preparation of a latex dispersion or emulsion that comprises a vulcanising agent, an activator and the accelerator composition of claim 1; (ii) maturation of the latex dispersion for a period of from 0.5 to 1.5 days; (iii) dipping a former in the shape of the article into the latex; and (iv) curing the latex present on the former.

8. Shaped synthetic elastomeric articles, prepared from the curable aqueous synthetic rubber latex composition of claim 3.

9. Cured shaped synthetic elastomeric articles according to claim 8, characterized by a tensile strength of at least 24 MPa (according to ASTM D-412) and an elongation at break of at least 750%.

10. Shaped synthetic elastomeric articles, prepared from the curable aqueous synthetic rubber latex composition of claim 4.

11. Cured shaped synthetic elastomeric articles according to claim 10, characterized by a tensile strength of at least 24 MPa (according to ASTM D-412) and an elongation at break of at least 750%.

12. Shaped synthetic elastomeric articles, prepared from the curable aqueous synthetic rubber latex composition of claim 5.

13. Cured shaped synthetic elastomeric articles according to claim 12, characterized by a tensile strength of at least 24 MPa (according to ASTM D-412) and an elongation at break of at least 750%.

14. Shaped synthetic elastomeric articles, prepared from the curable aqueous synthetic rubber latex composition of claim 6.

15. Cured shaped synthetic elastomeric articles according to claim 14, characterized by a tensile strength of at least 24 MPa (according to ASTM D-412) and an elongation at break of at least 750%.

16. Shaped synthetic elastomeric articles, prepared from the curable aqueous synthetic rubber latex composition of claim 7.

17. Cured shaped synthetic elastomeric articles according to claim 16, characterized by a tensile strength of at least 24 MPa (according to ASTM D-412) and an elongation at break of at least 750%.

* * * * *